United States Patent [19]
Ito et al.

[11] 4,144,443
[45] Mar. 13, 1979

[54] APPARATUS FOR HORIZONTAL FILLET WELDING OF STEEL PLATES

[75] Inventors: Yoshinori Ito, Nishinomiya; Masaaki Kawai, Ashiya; Masahiko Ikeda, Minoo, all of Japan

[73] Assignee: Sumitomo Metal Industries Limited, Osaka, Japan

[21] Appl. No.: 829,655

[22] Filed: Sep. 1, 1977

Related U.S. Application Data

[62] Division of Ser. No. 654,950, Feb. 3, 1976, Pat. No. 4,058,700.

[51] Int. Cl.$^2$ .............................................. B23K 9/00
[52] U.S. Cl. ............................ 219/137.7; 219/137.44
[58] Field of Search ................ 219/137.2, 137.31, 136, 219/137.44, 137.7

[56] References Cited

U.S. PATENT DOCUMENTS

| | | | |
|---|---|---|---|
| 3,596,051 | 7/1971 | Nomura | 219/137.2 |

FOREIGN PATENT DOCUMENTS

| | | | |
|---|---|---|---|
| 195215 | 2/1956 | Austria | 219/137.44 |
| 1397236 | 6/1975 | United Kingdom | 219/137 |
| 288950 | 4/1971 | U.S.S.R. | 219/137 |

*Primary Examiner*—E. A. Goldberg
*Attorney, Agent, or Firm*—Watson, Cole, Grindle & Watson

[57] ABSTRACT

A method and apparatus for horizontal fillet welding of steel plates, particularly coated or painted steel plates, in which two spaced apart welding wires are directed toward the line of intersection of a vertical steel plate and a horizontal steel plate to be welded together so that the centerline defined between the two wires intersects with such line of intersection. The wires are alternately fed toward the line of intersection in such a manner that one of the wires is fed to the vertical plate at a first predetermined rate and the other of the wires is fed to the horizontal plate at a second predetermined rate which is greater than the first rate.

2 Claims, 5 Drawing Figures

APPARATUS FOR HORIZONTAL FILLET WELDING OF STEEL PLATES

This application is a divisional application of application Ser. No. 654,950 filed Feb. 3, 1976, now U.S. Pat. No. 4,058,700.

BACKGROUND OF THE INVENTION

1. Field of the Invention

The present invention relates to an arc welding process and apparatus for preventing the occurrence of pits and blowholes which are often times generated when steel plates coated with, for example, anti-rust paint, are butted together in a T-shape for horizontal fillet welding, thus obtaining an improved weld bead appearance.

In shipbuilding and bridge construction, a large portion of the weld joints are fillet welds, so that an automated fillet welding technique will improve upon the efficiency of the overall welding operation.

2. Description of the Prior Art

Gas shielded arc welding, submerged arc welding and other welding techniques are all capable of being automatically carried out. However, when fillet welding steel plates coated, for example, with anti-rust paint, the gas generated by the decomposition of the anti-rust paint causes pits and blowholes in the plates, thus requiring additional labor for repairs which decreases the efficiency of the operation.

Furthermore, during such horizontal fillet welding the generated arc is customarily not made coincident with the line of intersection between the horizontal steel plate and the vertical steel plate, but is instead directed at the top surface of the horizontal plate. Such is illustrated in the prior art, as shown in FIG. 1 wherein a vertical steel plate 1 is disposed in perpendicular fashion to a horizontal steel plate 2 and the fillet welding operation is carried out with the use of a power supply nozzle 3 supporting a welding wire or electrode 4. The center of the generated arc is normally off center from the line of intersection of the plates by a distance X of approximately 2mm from the vertical plate. The reason for this is that when the arc is directed toward such line of intersection, an undercut 5 of the weld bead 6 results in vertical steel plate 1, typically as shown in FIG. 2.

Moreover, it has been found that the above-mentioned deviation of the arc center by the distance X likewise causes the anti-rust paint of the horizontal steel plate to decompose at the butt section of the vertical steel plate and the horizontal plate, whereby the decomposed gas is contained within the weld bead, which itself develops pits and blowholes.

SUMMARY OF THE INVENTION

It is therefore an object of the present invention to avoid the above-mentioned drawbacks. An improved welding zone is effected by the invention by regularly and alternatively feeding during a single pass two welding wires so as to provide an arc welding process for horizontal fillet welded joints wherein the generation of blowholes is avoided in the horizontal fillet welding zone.

Another object of the present invention is to provide a horizontal fillet welding apparatus which carries out the above-mentioned arc welding method effectively.

Other objects, advantages and novel features of the invention will become more apparent from the following detailed description of the invention when taken in conjunction with the accompanying drawings.

DESCRIPTION OF THE PREFERRED EMBODIMENT

The apparatus according to the present invention will be described with reference to FIGS. 3 to 5, FIGS. 1 and 2 illustrating the prior art as described above.

Figure 5:
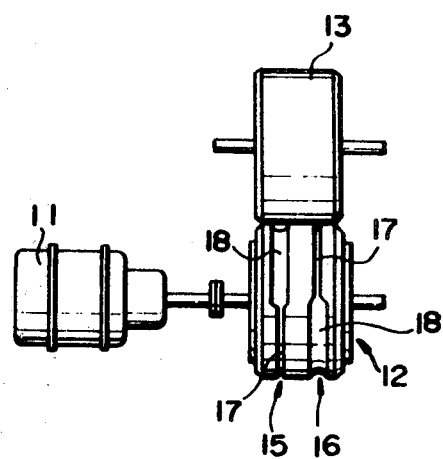
FIG. 5 is an enlarged plan view of a welding wire feed roll taken substantially along line 5—5 of FIG. 3 used to carry out the method of the present invention.

Welding electrodes in the form of wires 7 and 8 are unwound from welding wire feed reels 9 having axes disposed parallel to one another so that the unfed wires 7 and 8 are likewise disposed in parallel. The wires are extended to the intended weld zone of plates 1 and 2 through a power supply nozzle 10, and a wire feed roll 12 driven by a motor 11 is provided between power supply nozzle 10 and feed reels 9 for carrying out the unwinding operation. The outer peripheral surface of wire feed roll 12 is disposed in contacting engagement with a smooth surface of a pressure roll 13 as shown in FIG. 5.

Figure 4:
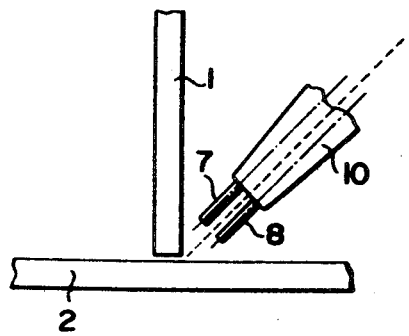
FIG. 4 is an enlarged view of the welding section of FIG. 3.

Parallel welding wires 7 and 8, which are spaced apart a distance of less than about 2mm, are so disposed that the centerline (dotted line in FIG. 4) between them substantially intersects with the line of intersection between vertical steel plate 1 and horizontal steel plate 2, with the end tips of the power supply nozzle 10 being spaced from such line of intersection by about 15 to 25mm (See Fig. 4).

A drive unit 20 is provided for moving nozzle 10 parallel to and along the line of intersection defined between vertical steel plate 1 and horizontal steel plate 2. Such a unit is designed to move nozzle 10 at a constant speed along the aforedescribed line of the intersection.

Pressure roll 13 is mounted for free rotation about its axis and is rotated solely by the rotation of wire feed roll 12 in rolling contact therewith.

Parallel grooves 15 and 16 are disposed in the outer peripheral surface of wire feed roll 12, which roll is normally rotated at 30 to 80 rpm. Each parallel groove 15,16 comprises a narrow guide groove 17 having a cross-sectional dimension substantially equal to the diameter of the welding wire, and a guide groove 18 wider in cross-section than groove 17 as shown in FIG. 5. The narrow and wider guide grooves of groove 15 are disposed oppositely of the wider and narrow guide grooves of groove 16, respectively, so that the narrow and wider guide grooves are positioned alternately, as shown. At least one narrow guide groove 17 and one wider guide groove 18, having their centerlines coincident, open into one another for each parallel groove 15 and 16, although more than one narrow and one wider groove for each parallel groove may be provided without departing from the invention.

The width of the narrow guide groove 17 in each of the grooves 15 and 16 is determined by each diameter of welding wires 7 and 8 to be fed, and the length of each guide groove 17 is determined by each feed time desired for welding wires 7 and 8.

Welding wires 7 and 8 are fed by their length corresponding to the length of narrow guide groove 17 by the frictional force generated between narrow guide groove 17 and pressure roll 13, but they are not fed in wide guide groove 18 because no frictional force is generated therein.

The positive side of a welding power unit 19 with a DC constant voltage characteristic is connected to power supply nozzle 10, and the negative side is connected to horizontal plate 2, as in the normal manner.

As mentioned above, the welding operation carried out with the present apparatus is performed alternately by igniting one welding wire during its feeding condition for melting same by the arc in the customary manner, and extinguishing the other welding wire which is in the stopped condition for feeding.

The method which is carried out by using such apparatus will be described with reference to FIG. 4.

As shown in FIG. 4, two welding wires 7 and 8 are alternately fed from the solid power supply nozzle 10 to the line of intersection between vertical steel plate 1 and horizontal steel plate 2, although this is not the simple alternate feed of two welding wires, but is improved further in the feed conditions thereof.

In the present invention, the respective welding wires for the vertical and horizontal steel plates are of different diameters so as to render the welding currents thereby produced different, and/or they are fed at different intervals. In such case, the welding wire for the vertical steel plate is of a smaller diameter (therefore, the narrow guide groove is accordingly more narrow), to lower the welding current, and/or the feed time of the welding wire for the vertical steel plate is made shorter (therefore, the narrow guide groove is shorter in length), to obtain a favorable weld bead.

Shown below is a comparison between the embodiment of the present invention and the prior art.

Figure 1:
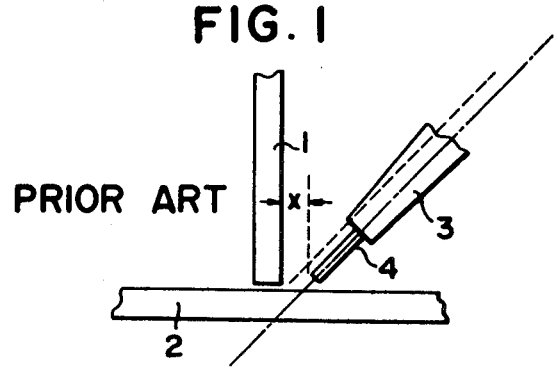
FIG. 1 is an end elevational view illustrating a horizontal fillet welding technique in accordance with the prior art.
Figure 2:
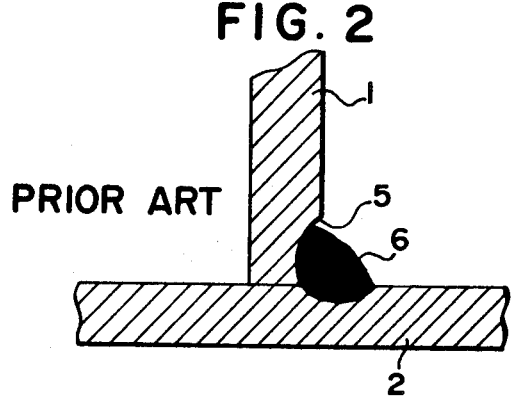
FIG. 2 is an enlarged sectional view of FIG. 1 illustrating a weld bead and an undercut typically caused by conventional welding techniques.
Figure 3:
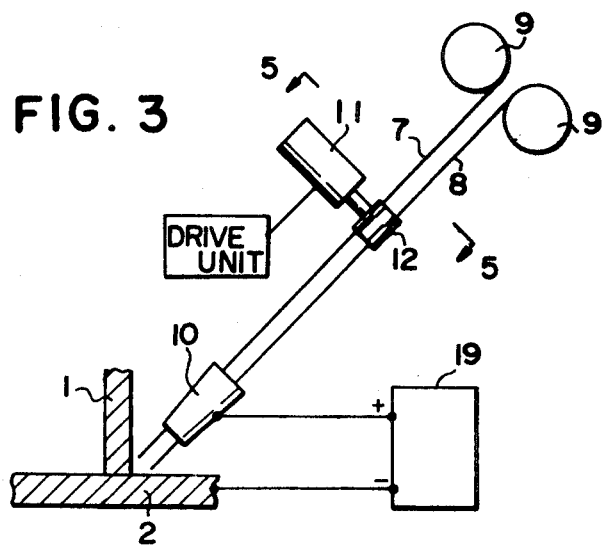
FIG. 3 is a schematic side view of a welding apparatus according to the present invention, shown in relation to the perpendicularly related plates of FIG. 1.

The 12mm thick sample steel plates shown in the following Table 1 coated with a 20µ thick wash primer, and they were butted together in a T-shape as shown in FIGS. 3 and 4 to be used as the test pieces for welding.

Table 1

| Chemical composition of sample steel plates | | | | |
|---|---|---|---|---|
| C | Si | Mn | p | S |
| 0.15 | 0.02 | 0.47 | 0.021 | 0.020 |

For welding, the submerged arc welding and the carbon dioxide gas arc welding techniques were employed, and the chemical composition of the flux for submerged arc welding are respectively shown in Table 2 and Table 3.

Table 2

| Chemical composition of welding wires | | | | |
|---|---|---|---|---|
| | C | Si | Mn | Ti |
| $CO_2$ gas arc welding | 0.08 | 0.73 | 1.42 | 0.17 |
| Submerged arc welding | 0.12 | 0.01 | 1.43 | — |

Table 3

| Chemical composition of flux for submerged arc welding | | | | | | |
|---|---|---|---|---|---|---|
| $SiO_2$ | CaO | MgO | $CaF_2$ | MnO | $Al_2O_3$ | $TiO_2$ |
| 40 | 20 | 20 | 6 | 6 | 4 | 4 |

The carbon dioxide gas as shielding gas is for welding, and the flow rate is 25/min.

Seven types of driving wire feed rolls (outer diameter 32mm) were prepared as shown in Table 4. The A of Table 4 shows the wire feed roll used as the prior art, and the remainder is for the welding apparatus with the feed roll according to the present invention.

Table 4

| | Wire feed rolls | | | |
|---|---|---|---|---|
| | Number of grooves in the roll | Diameter of welding wire used (mm) | | Welding wire feed time ratio | |
| No. | | For horizontal plate | For vertical plate | For horizontal plate | For vertical plate |
| A | 1 | 1.6 | — | 1 | 0 |
| B | 2 | 1.6 | 1.6 | 1 | 1 |
| C | 2 | 1.6 | 1.6 | 2 | 1 |
| D | 2 | 1.6 | 1.6 | 3 | 1 |
| E | 2 | 1.6 | 1.2 | 2 | 1 |
| F | 2 | 1.6 | 1.2 | 2 | 1 |
| G | 2 | 1.6 | 1.2 | 3 | 1 |

The speed of the feed rolls was set to 50 rpm.

Table 5 shows the welding conditions and results for and by the horizontal fillet welding of the above-mentioned welding test pieces.

Table 5

| Embodiment (welding conditions and results) | | | | | | | | |
|---|---|---|---|---|---|---|---|---|
| Test No. *** | Welding method * | Wire feed roll (table 4) | Wire diameter used (mm) | | Wire feed time ratio | | welding current (amp) ** | |
| | | | For horizontal plate | For vertical plate | For horizontal plate | For vertical plate | For horizontal plate | For vertical plate |
| 1 | SAW | A | 1.6 | — | 1 | 0 | 300 | — |
| 2 | $CO_2$ | A | 1.6 | — | 1 | 0 | " | — |
| 3 | " | B | 1.6 | 1.6 | 1 | 1 | " | 300 |
| 4 | " | C | 1.6 | 1.6 | 2 | 1 | " | " |
| 5 | " | D | 1.6 | 1.6 | 3 | 1 | " | " |
| 6 | " | E | 1.6 | 1.2 | 1 | 1 | " | 170 |
| 7 | " | F | 1.6 | 1.2 | 2 | 1 | " | " |
| 8 | " | G | 1.6 | 1.2 | 3 | 1 | " | " |
| 9 | SAW | F | 1.6 | 1.2 | 2 | 1 | " | " |
| 10 | " | G | 1.6 | 1.2 | 3 | 1 | " | " |

| Welding results | | | |
|---|---|---|---|
| Bead appearance | Pits | Blowholes | Remarks |
| Normal | Generated | Generated | Prior art Method by the present invention |
| Normal | Generated | Generated | Welding wire alternate feed |
| Undercut caused | Not generated | Not generated | |
| Normal | " | " | |
| Good | " | " | |
| Normal | " | " | |
| Good | " | " | |
| Good | " | A little generated | |
| Good | " | Not generated | |
| Good | " | " | |

*$CO_2$: Carbon dioxide gas arc welding SAW: Submerged arc welding
**Arc voltage: 30V for 300 apm 26V for 170 amp
***Welding speed: 70cm.min.

As can be seen from the above Table, according to the prior processes in which the steel plate coated with a wash primer is used, the pits are observed on the surface of the weld heads. According to the method of the present invention on the other hand, no pits are observed on the weld bead surface, though some blowholes are generated.

It was also found that with the wire feed conditions of the present invention, to obtain good bead appearance free from the generation of an undercut, it was necessary to make the wire diameter for the vertical steel plate side smaller than that for the horizontal steel plate side and/or to make the wire feed time for the vertical steel plate side smaller than that for the horizontal steel plate side.

Thus, in the horizontal fillet welding of the steel plate coated with an anti-rust paint, the prior art renders the welding difficult to automate because of the generation of blowholes. However, according to the present invention generation of blowholes is avoided, and while one welding wire is ignited, the other welding wire which is extinguished is positioned apart from the welding zone so that it is unnecessary to insulate these two welding wires from each other. Therefore, the horizontal fillet welding technique is capable of being automated in accordance with the invention.

Furthermore, the method according to the present invention can be used as a preceding head with the conventional method used as a following head to produce the same effect, and it can be applied not only to steel plates but to other steel materials as well.

What is claimed is:

1. An apparatus for horizontal fillet welding together a vertical steel plate and a horizontal steel plate butted together in a T-shape and having a line of intersection, comprising a pair of welding wires, means for alternately feeding said wires at different rates of feed, a power supply nozzle through which said wires are fed, said power supply nozzle being directed toward said line of intersection and so disposed that one of said wires is fed to said vertical plate and the other of said wires is alternately fed to said horizontal plate, a welding power source connected to said nozzle and to one of said plate for passing an electric current alternately through said wires for the fillet welding of said plates, means for moving said nozzle along said line of intersection; and wherein said feed means comprises a feed roll rotatable at a constant speed, said roll having a pair of parallel guide grooves around on the outer peripheral surface thereof, guide grooves respectively receiving said welding wires, and a pressure roll in rotating contact with said outer surface of said drive roll; each of said guide grooves consisting of a narrow portion and a wide portion, said narrow portion of each guide groove having a sectional dimension substantially equal to the diameter of each welding wire and serving to feed each welding wire to said power supply nozzle when said presure roll is in contact with said narrow portion so as to engage each welding wire with said pressure roll, said wide portion of each guide grooves having a sectional dimension greater than the diameter of each welding wire and serving to stop the feeding of each welding wire to said power supply nozzle by separating each welding wire from the surface of said pressure roll when said wide portion is in contact with said pressure roll, said narrow and wide portions being so disposed relative to one another that when one of said guide grooves for the welding wire to be fed to said vertical steel plate is in contact at its narrow portion with said pressure roll, another of said guide grooves for the welding wire to be fed to the horizontal steel plate is in contact at its wide portion with said pressure roll, and when said one guide groove is in contact at its wide portion with said pressure roll, said another guide groove is in contact at its narrow portion with said pressure roll; and the ratio of the length of said narrow portion to said wide portion of the guide groove for said welding wire to be fed to said vertical steel plate is in a range of 1:1 to 1:4, whereby said welding wires are fed alternately to said vertical steel plate and to said horizontal steel plate in a proportion of the ratio of 1:1 to 1:4.

2. Apparatus as set forth in claim 1, wherein the ratio of the wire to be fed to said vertical plate to the wire to be fed to the horizontal plate is, in diameter, in the range of 1:1 to 3:4.

* * * * *